United States Patent
Zhang

(10) Patent No.: US 9,378,095 B2
(45) Date of Patent: Jun. 28, 2016

(54) MOBILE TERMINAL CAPABLE OF RECOVERING AN APPLICATION AFTER BEING REBOOTED AND CORRESPONDING METHOD THEREOF

(71) Applicant: HUIZHOU TCL MOBILE COMMUNICATION CO., LTD, Huizhou, Guangdong (CN)

(72) Inventor: Fan Zhang, Guangdong (CN)

(73) Assignee: HUIZHOU TCL MOBILE COMMUNICATION CO., LTD, Huizhou, Guangdong (CN)

( * ) Notice: Subject to any disclaimer, the term of this patent is extended or adjusted under 35 U.S.C. 154(b) by 87 days.

(21) Appl. No.: 14/404,268

(22) PCT Filed: Aug. 14, 2013

(86) PCT No.: PCT/CN2013/081431
§ 371 (c)(1),
(2) Date: Nov. 26, 2014

(87) PCT Pub. No.: WO2014/107957
PCT Pub. Date: Jul. 17, 2014

(65) Prior Publication Data
US 2015/0227428 A1    Aug. 13, 2015

(30) Foreign Application Priority Data

Jan. 9, 2013    (CN) .......................... 2013 1 0008571

(51) Int. Cl.
*G06F 11/00*    (2006.01)
*G06F 11/14*    (2006.01)
(Continued)

(52) U.S. Cl.
CPC .............. *G06F 11/1435* (2013.01); *G06F 1/30* (2013.01); *G06F 11/1402* (2013.01); *G06F 11/1441* (2013.01); *G06F 11/3062* (2013.01); *G06F 11/2015* (2013.01); *G06F 2201/84* (2013.01)

(58) Field of Classification Search
CPC .................................................... G06F 11/1402
USPC ......... 714/6.13, 6.11, 6.12, 2, 1, 23, 38.1, 44, 714/47.1
See application file for complete search history.

(56) References Cited

U.S. PATENT DOCUMENTS

| 5,379,435 A * | 1/1995 | Hanaoka ................... G06F 1/30 713/2 |
| 6,226,575 B1 * | 5/2001 | Lu .......................... G08G 1/042 340/428 |

(Continued)

FOREIGN PATENT DOCUMENTS

| CN | 1573717 A | 2/2005 |
| CN | 101192842 A | 6/2008 |

(Continued)

*Primary Examiner* — Dieu-Minh Le
(74) *Attorney, Agent, or Firm* — Ladas & Parry LLP

(57) ABSTRACT

A mobile terminal capable of recovering an application after being rebooted is provided. The mobile terminal comprises a terminal body and a battery. The terminal body comprises a power-supply management module, a power-off monitoring module, a baseband chip module, a memory module and a backup-energy storage module. The backup-energy storage module is configured to power the terminal body when the battery is detached from the terminal body, and the power-off monitoring module is configured to feed back a power-off signal to the baseband chip module when the battery is detached from the terminal body. The baseband chip module is connected to the memory module, and is configured to, after receiving the power-off signal, save a related parameter of an application currently running the volatile memory of the memory module into the non-volatile memory.

19 Claims, 2 Drawing Sheets

(51) Int. Cl.
  *G06F 1/30*   (2006.01)
  *G06F 11/30*  (2006.01)
  *G06F 11/20*  (2006.01)

(56) References Cited

U.S. PATENT DOCUMENTS

2002/0087816 A1*  7/2002  Atkinson ................ G06F 12/08
                                                      711/156
2005/0005188 A1*  1/2005  Hsu ..................... G06F 11/2092
                                                      714/2
2009/0116288 A1*  5/2009  Varkony ................ G11C 5/145
                                                      365/185.13
2009/0262642 A1*  10/2009 van Greunen ........... H04L 12/24
                                                      370/216
2010/0008175 A1*  1/2010  Sweere ................ G06F 12/0866
                                                      365/229

FOREIGN PATENT DOCUMENTS

CN         103092315 A     5/2013
WO         2005/076281 A1  8/2005

* cited by examiner ant No. 201310008571.5 filed on 9 Jan. 2013, the disclo-
MOBILE TERMINAL CAPABLE OF RECOVERING AN APPLICATION AFTER BEING REBOOTED AND CORRESPONDING METHOD THEREOF

RELATED APPLICATION

This application is a national phase entry under 35 USC 371 of International Patent Application No PCT/CN2013/081431 filed on 14 Aug. 2013, which was published on 12 Jul. 2014 with International Publication Number WO 2014/107957 A1, which claims priority from Chinese Patent Application No. 201310008571.5 filed on 9 Jan. 2013, the disclosures of which are incorporated in their entirety by reference herein.

FIELD OF THE INVENTION

The present disclosure relates to the technical field of electronic apparatuses, and more particularly, to a mobile terminal capable of recovering an application after being rebooted and a corresponding method thereof.

BACKGROUND OF THE INVENTION

Owing to the advancement of science and technologies, various kinds of mobile terminals have found wide application in people's work and daily life. A mobile terminal generally comprises a terminal body and a battery. In the prior art, applications of the mobile terminal run in a random access memory (RAM). However, the RAM is a kind of volatile memory, so in case that the terminal body is powered off (e.g., the battery is detached from the terminal body accidentally or the battery runs out of power), the applications that were running when the mobile terminal was powered off cannot be recovered after it is powered on again. This leads to loss of the user's data and brings about inconveniences to the user.

Accordingly, a need exists in the art to provide a mobile terminal capable of recovering an application after being rebooted and a corresponding method thereof so as to solve the aforesaid problem.

SUMMARY OF THE INVENTION

A primary technical problem to be solved in the present disclosure is to provide a mobile terminal capable of recovering an application after being rebooted, which can recover the applications that were running when it was powered off after it is rebooted.

To solve the aforesaid technical problem, a technical solution adopted in the present disclosure is to provide a mobile terminal capable of recovering an application after being rebooted, wherein the mobile terminal comprises a terminal body and a battery, the terminal body comprises a power-supply management module, a power-off monitoring module, a baseband chip module, a memory module, a peripheral module and a backup-energy storage module, wherein the battery is detachably attached to the terminal body and is configured to power the terminal body via the power-supply management module after being attached to the terminal body; the backup-energy storage module is configured to store electric power when the battery is attached to the terminal body and to power the terminal body via the power-supply management module when the battery is detached from the terminal body, the power-off monitoring module is configured to feed back a power-off signal to the baseband chip module when the battery is detached from the terminal body; the memory module is connected to the baseband chip module and comprises a volatile memory and a non-volatile memory, the non-volatile memory has a status bit stored therein, the baseband chip module is configured to, after receiving the power-off signal, save a related parameter of an application currently running in the volatile memory into the non-volatile memory and set the status bit to a first status, and the power-off monitoring module feeds back a power-off signal to the peripheral module when the battery is detached from the terminal body so as to deactivate the peripheral module.

The baseband chip module comprises an interruption detecting unit, and an output terminal of the power-off monitoring module is connected with the interruption detecting unit so as to feed back a power-off signal in the form, of an interruption to the baseband chip module when the battery is detached from the terminal body.

The baseband chip module further reads the status bit when the mobile terminal is powered on, and if the status bit is in the first status, then reads the related parameter saved in the non-volatile memory to recover the application corresponding to the related parameter and to set the status bit to a second status different from the first status.

To achieve the aforesaid technical problem, another technical solution adopted in the present disclosure is to provide a mobile terminal capable of recovering an application after being rebooted, wherein the mobile terminal comprises a terminal body and a battery, the terminal body comprises a power-supply management module, a power-off monitoring module, a baseband chip module, a memory module, and a backup-energy storage module, wherein the battery is detachably attached to the terminal body and is configured to power the terminal body via the power-supply management module after being attached to the terminal body. The backup-energy storage module is configured to store electric power when the battery is attached to the terminal body and to power the terminal body via the power-supply management module when the battery is detached from the terminal body, and the power-off monitoring module is configured to feed back a power-off signal to the baseband chip module when the battery is detached from the terminal body. The memory module is connected to the baseband chip module and comprises a volatile memory and a non-volatile memory, and the baseband chip module is configured to save a related parameter of an application currently running in the volatile memory into the non-volatile memory after receiving the power-off signal.

The battery comprises a cell and a first resistor, the first resistor has a first terminal connected to a cathode of the cell, the cell has the cathode thereof connected to a ground of the terminal body and has an anode thereof connected to a voltage input, terminal of the power-supply management module when the battery is attached to the terminal body, the power-off monitoring module comprises a comparator, a second resistor, a third resistor and a fourth resistor, the comparator has a grounding terminal thereof connected to the ground of the terminal body and an operation voltage terminal thereof connected to a voltage output terminal of the power-supply management module, the second resistor has a first terminal thereof connected to a first input terminal of the comparator and a second terminal thereof connected to the ground of the terminal body, the third resistor has a first terminal thereof connected to the first terminal of the second resistor and a second terminal thereof connected to the voltage output terminal of the power-supply management module, the fourth resistor has a first terminal thereof connected to the voltage input terminal of the power-supply management module and a second terminal thereof connected to a second input terminal of the comparator and, when the battery is attached to the terminal body, to the second terminal of the first resistor, and the resistances of the first resistor, the second resistor, the third resistor and the fourth resistor are determined in such a way that different signals are output by the output terminal of the comparator when the battery is attached to and detached from the terminal body respectively.

The first input terminal of the comparator is a positive input terminal, and the second input terminal of the comparator is an inverting input terminal, and the resistances of the first resistor, the second resistor, the third resistor and the fourth resistor are determined in such a way that, when the battery is attached to the terminal body, a divided voltage at the inverting input terminal of the comparator is lower than a divided voltage at the positive input terminal of the comparator.

The backup-energy storage module comprises a capacitor, which has a first terminal thereof connected to the voltage input terminal of the power-supply management module and a second terminal thereof connected to the ground of the terminal body.

The terminal body further comprises a peripheral module, and the power-off monitoring module further feeds back a power-off signal to the peripheral module when the battery is detached from the terminal body so as to deactivate the peripheral module.

The baseband chip module comprises an interruption detecting unit, and an output terminal of the power-off monitoring module is connected with the interruption detecting unit so as to feed back a power-off signal in the form, of an interruption to the baseband chip module when the battery is detached from the terminal body.

The baseband chip module further comprises an input/output (I/O) interface unit, the terminal body further comprises a logic gate, the I/O interface unit is configured to output a deactivating signal of the peripheral module to a first input terminal of the logic gate, the power-off monitoring module outputs the power-off signal to a second input terminal of the logic gate, and an output terminal of the logic gate is connected with the peripheral module so as to deactivate the peripheral module when either of the deactivating signal and the power-off signal appears.

The deactivating signal and the power-off signal are low-voltage signals and the logic gate is an AND gate.

The non-volatile memory further has a status bit stored therein, and the baseband chip module sets the status bit to a first status after receiving the power-off signal.

The baseband chip module further reads the status bit when the mobile terminal is powered on, and if the status bit is in the first status, then reads the related parameter saved in the non-volatile memory to recover the application corresponding to the related parameter and to set the status bit to a second status different from the first status.

The present disclosure has the following benefits: as compared to the prior art, the mobile terminal of the present disclosure monitors in real time, by means of the power-off monitoring module, whether the battery is detached from the terminal body and, when the battery is detached from the terminal body, activates the backup-energy storage module to power the terminal body and feeds back a power-off signal to the baseband chip module, and then the baseband chip module saves a related parameter of an application currently running in the volatile memory into the non-volatile memory after receiving the power-off signal. Thereby, applications that were running when the mobile terminal was powered off can be recovered after it, is rebooted.

To solve the aforesaid technical problem, yet another technical solution in the present disclosure is to provide a method for recovering an application of a mobile terminal after being rebooted, wherein the mobile terminal comprises a terminal body and a battery detachably attached to the terminal body and configured to power the terminal body after being attached to the terminal body, and the method comprises: monitoring whether the battery is detached from the terminal body; if a monitoring result indicates the battery is detached from the terminal body, beginning to supply electric power to the terminal body by a backup-energy storage module of the terminal body; saving a related parameter of an application currently running in a volatile memory of the terminal body into a non-volatile memory thereof, and setting a status bit of an "application recovering" instruction saved in the non-volatile memory to a first status; and power off the mobile terminal.

The method further comprises: powering on the mobile terminal; reading the status bit of the "application recovering" instruction saved in the non-volatile memory, and determining whether the status bit thereof is the first status; if the status bit thereof is the first status, reading the related parameter saved in the non-volatile memory; recovering the corresponding application according to the related parameter saved in the non-volatile memory, and setting the status bit thereof to be a second status different from the first status.

After the step of reading the status bit of the "application recovering" instruction saved in the non-volatile memory and determining whether the status bit thereof is the first status, the method further comprises: if the status bit thereof is not the first status, entering into a normal boot interface.

The method further comprises: if the monitoring result indicates the battery is not detached from the terminal body, returning to execute the step of monitoring whether the battery is detached from the terminal body again.

The method further comprises: turning off a periphery module of the terminal body when supplying the electric power to the terminal body by the backup-energy storage module of the terminal body.

The method further comprises: storing the electric power in the backup-energy storage module when the battery is attached to the terminal body.

DETAILED DESCRIPTION OF THE INVENTION

Figure 1:
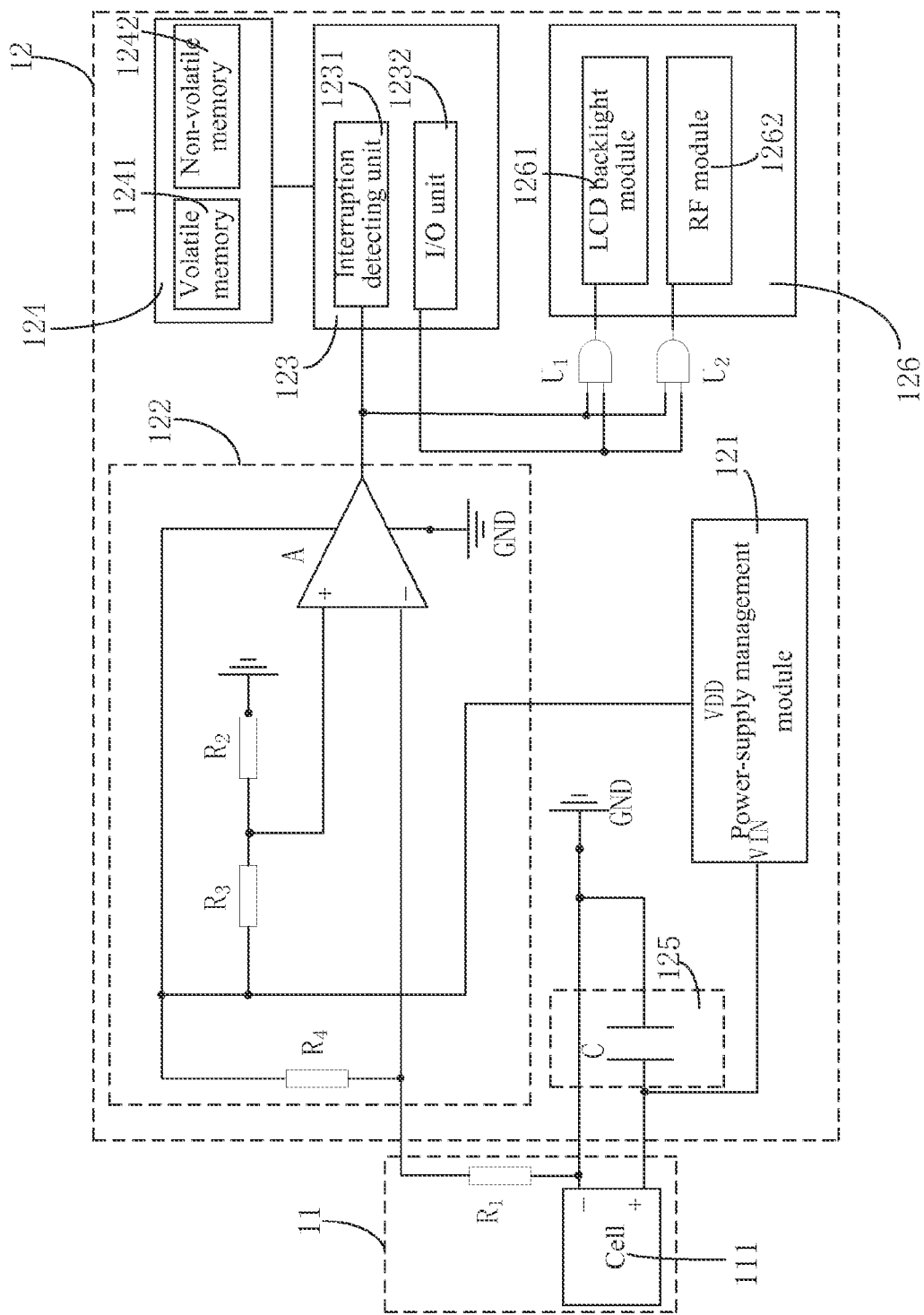
FIG. 1 is a schematic structural view of a preferred embodiment of a mobile terminal according to the present disclosure.

The present disclosure will be detailed hereinbelow with reference to the attached drawings and the embodiments.

Referring to FIG. 3, there is shown a schematic structural view of a preferred embodiment of a mobile terminal according to the present disclosure. In this embodiment, the mobile terminal comprises a battery 11 and a terminal body 12. The battery 11 is detachably attached to the terminal body 12.

The terminal body 12 comprises a power-supply management module 121, a power-off monitoring module 122, a baseband chip module 123, a memory module 124, a backup-energy storage module 125, a peripheral module 126, a first AND gate $U_1$ and a second AND gate $U_2$.

The battery 11 comprises a cell 111 and a first resistor $R_1$. The cell 11 can be charged and discharged repeatedly. When the cell 111 is being charged, the electric energy acquired from the outside of the mobile terminal is converted into chemical energy in the cell 111; and when the cell 111 is being discharged, the chemical energy of the cell 111 is converted into the electric energy to be supplied to the terminal body 12 via the power-supply management module 121. A first terminal of the first resistor $R_1$ is connected to a cathode of the cell 111. When the battery 11 is attached to the terminal body 12, the cell 111 has the cathode thereof connected to a ground GND of the terminal body 12 and an anode thereof connected to a voltage input terminal VIN of the power-supply management module 121.

The backup-energy storage module 125 comprises a capacitor C, which has a first terminal thereof connected to the voltage input terminal of the power-supply management module 121 and a second terminal thereof connected to the ground GND of the terminal body 12. When the battery 11 is attached to the terminal body 12, the two terminals of the capacitor C are connected to the anode and the cathode of the cell 111 respectively, the capacitor C is in a charging state, and meanwhile, the capacitor C can keep the output voltage of the cell 11 stable. When the battery 11 is detached from the terminal body 12, the two terminals of the capacitor C are disconnected from the anode and the cathode of the cell 111, and the capacitor C powers the terminal body 12 for a period of time. In this embodiment, the capacitance of the capacitor C is preferably 10 millifarads (mF); and in other embodiments, the capacitance of the capacitor C may also be other values.

The operation principles of the backup-energy storage module 125 will be described hereinbelow with reference to the embodiment.

At the moment when the battery 11 is detached from the terminal body 12, the energy stored in the capacitor C is: $W_1 = \frac{1}{2} \times C \times u_1^2$.

where, $u_1$ is the voltage across the two terminals of the capacitor C at the moment when the battery 11 is detached from the terminal body 12 (i.e., the voltage of the battery), and C is the capacitance of the capacitor C.

At the moment when the terminal body 12 is powered down, the energy stored in the capacitor C is: $W_2 = \frac{1}{2} \times C \times u_2^2$.

where, $U_2$ is the voltage across the two terminals of the capacitor C at the moment when the terminal body 12 is powered down; and because the terminal body 12 is powered down at the moment when an input voltage of the input voltage terminal of the power-supply management module 121 is lower than the lowest input voltage thereof, $U_2$ is equal to the lowest input voltage of the power-supply management module 121.

In this embodiment, the voltage of the battery is preferably 3.7V, the lowest input voltage of the power-supply management module 121 is preferably 3V, $W_1$=0.06845 J, and $W_2$=0.045 J. Therefore, during the period from the moment when the battery 11 is detached from the terminal body 12 to the moment when the terminal body 12 is powered down, the energy that the capacitor C can provide to the terminal body 12 is: $W_1 - W_2$=0.02345 J.

The power-supply management module 121 is configured to convert the voltage output by the cell 111 or the backup-energy storage module 125 into a steady voltage necessary for each of the modules of the mobile terminal and then output the steady voltage.

The power-off monitoring module 122 comprises a comparator A, a second resistor $R_2$, a third resistor $R_3$ and a fourth resistor $R_4$. The comparator A has a grounding terminal thereof connected to the ground GND of the terminal body 12 and an operation voltage terminal thereof connected to a voltage output terminal VDD of the power-supply management module 121. The second resistor $R_2$ has a first terminal thereof connected to a first input terminal of the comparator A and a second terminal thereof connected to the ground GND of the terminal body 12. The third resistor $R_3$ has a first terminal thereof connected to the first terminal of the second resistor $R_2$ and a second terminal thereof connected to the voltage output, terminal VDD of the power-supply management module 121. The fourth resistor $R_4$ has a first terminal thereof connected to the voltage input terminal VTN of the power-supply management module 121 and a second terminal thereof connected to a second input terminal of the comparator A. When the battery 11 is attached to the terminal body 12, the second terminal of the fourth resistor $R_4$ is connected to the second terminal of the first resistor $R_1$; and when the battery 11 is detached from the terminal body 12, the second terminal of the fourth resistor $R_4$ is disconnected from the second terminal of the first resistor $R_1$.

In this embodiment, the first input terminal of the comparator A is a positive input terminal, and the second input terminal thereof is an inverting input terminal; and the resistances of the first resistor $R_1$, the second resistor $R_2$, the third resistor $R_3$ and the fourth resistor $R_4$ are determined in such a way that, when the battery 11 is attached to the terminal body 12, a divided voltage at the inverting input terminal of the comparator A is lower than a divided voltage at the positive input terminal of the comparator A. Specifically, the resistances of the first resistor $R_1$, the second resistor $R_2$, the third resistor $R_3$ and the fourth resistor $R_4$ are preferably 10 kΩ, 100 kΩ, 1 kΩ and 10 kΩ respectively. It should be understood that, in other embodiments, the first input terminal of the comparator A may also be the inverting input terminal, and the second input terminal thereof may also be the positive input terminal. In other embodiments, the resistances of the first resistor $R_1$, the second resistor $R_2$, the third resistor $R_3$ and the fourth resistor $R_4$ may also be set to be other resistances; the power-off monitoring module 122 may also adopt other elements and the elements therein may also have other connection relations as long as the output terminal of the power-off monitoring module 122 could output different signals when the battery 11 is attached to and detached from the terminal body 12 respectively.

The operation principles of the power-off monitoring module 122 will be described with reference to the embodiment of the present disclosure hereinbelow.

When the battery 11 is attached to the terminal body 12, the voltage at the inverting input terminal of the comparator A is:

$$\text{VDD} \times R_1/(R_1+R_4) = 10 \text{ k}\Omega/(10 \text{ k}\Omega) \times \text{VDD} = 0.5 \times \text{VDD};$$

the voltage at the positive input terminal of the comparator A is:

$$\text{VDD} \times R_2/(R_2+R_3) = 100 \text{ k}\Omega/(100 \text{ k}\Omega + 1 \text{ k}\Omega) \times \text{VDD} = 0.99 \times \text{VDD};$$

and in this case, the voltage at the positive input terminal of the comparator A is larger than the voltage at, the inverting input terminal thereof, so the output terminal of the comparator A outputs a high level signal.

When the battery 11 is detached from the terminal body 12, the first resistor $R_1$ is disconnected from the fourth resistor $R_4$; and in this case, the resistance of the first resistor $R_1$ is infinity, and the voltage at the inverting input terminal of the comparator A is:

$$\text{VDD} \times R_1/(R_1+R_4) = \infty/(\infty + 10 \text{ k}\Omega) \times \text{VDD} = \text{VDD};$$

the voltage at the positive input terminal of the comparator A is:

$$VDD \times R_2/(R_2+R_3) = 100 \text{ k}\Omega/(100 \text{ k}\Omega + 1 \text{ k}\Omega) \times VDD = 0.99 \times VDD;$$

and in this case, the voltage at the positive input terminal of the comparator A is smaller than the voltage at the inverting input terminal thereof, and the output terminal of the comparator A is a low level signal, so the comparator A outputs a power-off signal at this moment.

According to the above descriptions, the baseband chip module 123 comprises an interruption detecting unit 1231 and an input/output (I/O) interface unit 1232. The interruption detecting unit 1231 is connected with the output terminal of the comparator A. When the battery 11 is detached from the terminal body 12, the power-off signal outputted by the comparator A is fed back to the baseband chip module 123 in the form of an interruption. The I/O interface unit 1232 is configured to output a deactivating signal of the peripheral module 126 to a first input terminal of the first AND gate $U_1$ or a first input terminal of the second AND gate $U_2$, the power-off monitoring module 122 outputs the power-off signal to a second input terminal of the first AND gate $U_1$ or a second input terminal of the second AND gate $U_2$, and an output terminal of the first AND gate $U_1$ and an output terminal of the second AND gate $U_2$ are connected with the peripheral module 126. The peripheral module 126 is deactivated when either of the deactivating signal and the power-off signal appears.

Furthermore, in this embodiment, the peripheral module 126 comprises an LCD backlight module 1261 and a radio frequency (RF) module 1262. It should be understood that, in other embodiments, the peripheral module 126 may also comprise other modules that have relatively large power consumption in the terminal body 12. An enable terminal of the LCD backlight module 1261 is connected to the output terminal of the first AND gate $U_1$, and an enable terminal of the RF module 1262 is connected to the output terminal of the second AND gate $U_2$. Both the first input terminal of the first AND gate $U_1$ and the first input terminal of the second AND gate $U_2$ are connected to the I/O interface unit 1232; and both the second input terminal of the first AND gate $U_1$ and the second input terminal of the second AND gate $U_2$ are connected to the output terminal of the comparator A. The I/O interface unit 1232 outputs a deactivating signal of the LCD backlight module 1261 to the first input terminal of the first AND gate $U_1$, and outputs a deactivating signal of the RF module 1262 to the first input terminal of the second AND gate $U_2$. The output terminal of the comparator A (i.e., the output terminal of the power-off monitoring module 122) outputs the power-off signal to the second input terminal of the first AND gate $U_1$ and the second input terminal of the second AND gate $U_2$. In this embodiment, both the deactivating signal and the power-off signals are low level signals, the LCD backlight module 1261 is enabled when the enable terminal thereof is at a high level and is disabled when the enable terminal thereof is at a low level, and the RF module 1262 is enabled when the enable terminal thereof is at a high level and is disabled when the enable terminal thereof is at a low level. Therefore, the LCD backlight module 1261 is deactivated as long as there is a low level signal at either one of the input terminals of the first AND gate $U_1$; and the RF module is deactivated as long as there is a low level signal at either one of the input terminals of the second AND gate $U_2$. When the battery 11 is normally attached to the terminal body 12, the output terminal of the power-off monitoring module 122 outputs a high level signal, so the output level of the first AND gate $U_1$ and the second AND gate $U_2$ is determined by the baseband chip module 123, and the use of the peripheral module 126 is not affected by the power-off monitoring module 122. When the battery 11 is detached from the terminal body 12, the output terminal of the power-off monitoring module 122 outputs a low level signal; and regardless of the signal outputted by the I/O interface unit 1232 of the baseband chip module 123, both the output level of the first AND gate $U_1$ and the output level of the second AND gate $U_2$ are at a low level so that the peripheral module 126 is deactivated. It should be understood that, in other embodiments, the first AND gate $U_1$ and the second AND gate $U_2$ may also be replaced by other elements or other circuit modules so that the baseband chip module 123 and the power-off monitoring module 122 can control the peripheral module 126 to be activated or deactivated.

The memory module 124 comprises a volatile memory 1241 and a non-volatile memory 1242. The memory module 124 is connected to the baseband chip module 123. The baseband chip module 123 saves a related parameter of an application currently running in the volatile memory 1241 into the non-volatile memory 1242 after receiving the power-off signal. In this embodiment, the volatile memory 1241 is preferably a random access memory (RAM), and the non-volatile memory 1242 is preferably a flash memory. Because the related parameter of the application is saved into the RAM when the application is running and the RAM is a volatile memory, the related parameter of the application currently running in the RAM needs to be saved into the flash memory. The flash memory further has an "application recovering" instruction, which comprises a status bit, stored therein. After saving the related parameter of the application currently running in the RAM into the flash memory, the baseband chip module 123 sets the status bit to be 1. The baseband chip module 123 reads the status bit when the mobile terminal is powered on; and if the status bit is 1, the baseband chip module 123 reads the related parameter saved in the flash memory so as to recover the application corresponding to the related parameter and then set the status bit to be 0. It should be understood that, in other embodiments, the status bits 1 and 0 may also be replaced by the first status and the second status. The first status and the second status are two different statuses, and the mobile terminal can read the status bits to determine whether there is a need to recover the application when it is rebooted.

The operation principles of the mobile terminal will be described with reference to this embodiment hereinbelow.

When the battery 11 is detached from the terminal body 12, the backup-energy storage module 125 powers the terminal body 12, and meanwhile, the power-off monitoring module 122 makes a response immediately to output the low level signal, which is the power-off signal. The power-off signal not only serves to deactivate the peripheral module 126 via the first AND gate $U_1$, and the second AND gate $U_2$, but also serves to gives a notification to the interruption detecting unit of the baseband chip module 123. The interruption detecting unit 1231 responds to the power-off signal that is received, and the baseband chip module 123 saves the related parameter of the application currently running in the RAM into the flash memory and sets the status bit of the "application recovering" instruction to be 1. The time t needed to save the related parameter of the application into the flash memory is within 50 ms. Because the peripheral module 126 is deactivated after the battery 11 is detached from the terminal body 12, the current I flowing through the terminal body 12 is decreased to be within 100 mA. Therefore, the maximum energy that needs to be consumed during the time needed to save the related parameter of the application into the flash memory is:

$$W_3 = u_1 \times I \times t = 3.7V \times 0.1 A \times 0.05 s \times 0.0171 J.$$

During the period from the moment when the battery 11 is detached from the terminal body 12 to the moment when the terminal body 12 is powered down, the energy that the capacitor C can provide to the terminal body 12 is: $W_1 - W_2 = 0.02345$ J. The energy that the capacitor C can provide to the terminal body 12 during the period from the moment when the battery 11 is detached from the terminal body 12 to the moment when the terminal body 12 is powered down is larger than the maximum energy needed to be consumed during the time needed to save the related parameter of the application into the flash memory, so the mobile terminal will not be powered down during the process of saving the related parameter of the application into the flash memory.

Figure 2:
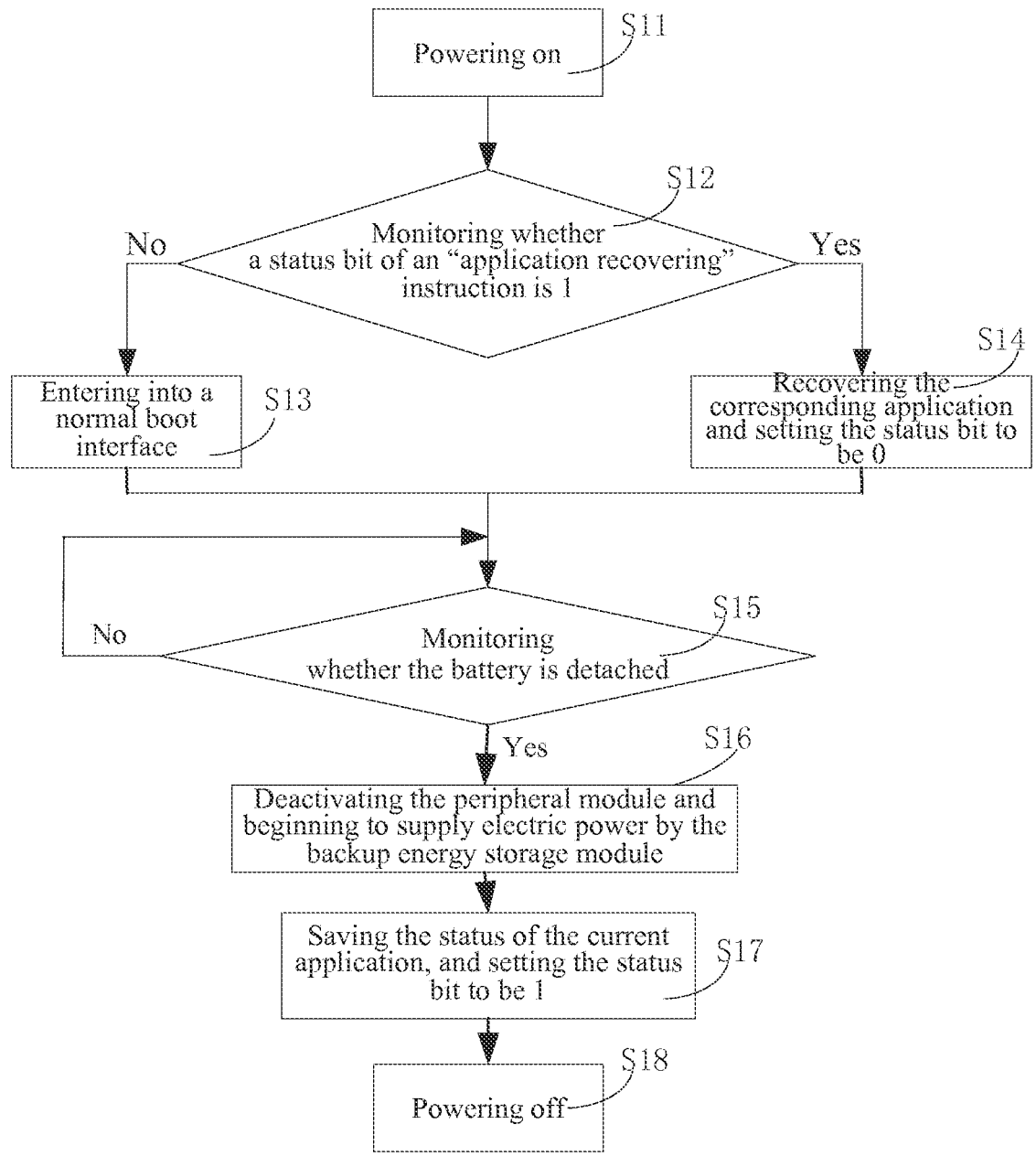
FIG. 2 is a schematic flowchart diagram, illustrating operations of the mobile terminal according to the present disclosure.

Referring to FIG. 2, there is shown a schematic flowchart diagram illustrating operations of the mobile terminal according to the present disclosure. The process flow of the mobile terminal according to the present disclosure comprise the following steps of:

Step S11: powering on the mobile terminal.

Step S12: reading a status bit of an "application recovering" instruction saved in the flash memory and determining whether the status bit is 1 by the baseband chip module 123 after the mobile terminal is powered on.

If the status bit is not 1 in the step S12, then step S13 is executed to enter into a normal boot interface; and if the status bit is 1 in the step S12, then step S14 is executed to read a related parameter stored in the flash memory so as to recover the corresponding application and then set the status bit to be 0.

Afterwards, the mobile terminal begins to operate normally; and during the normal operation of the mobile terminal, step S15 is executed to enable the power-off monitoring module 122 to monitor whether the battery 11 is detached from the terminal body 12.

If the battery 11 is not detached from the terminal body 12 in the step S15, then the step S15 is executed again; and if the battery 11 is detached from the terminal body 12 in the step S15, then the following steps will be executed:

Step S16: turning off the peripheral module 126 and beginning to supply electric power by the backup-energy storage module 125.

Step S17: saving the related parameter of the current application into the flash memory and setting the status bit to be 1.

Step S18: powering off the mobile terminal.

As compared to the prior art, the mobile terminal of the present disclosure monitors in real time, by means of the power-off monitoring module, whether the battery is detached from the terminal body and, when the battery is detached from the terminal body, activates the backup-energy storage module to power the terminal body and feeds back a power-off signal to the baseband chip module; then the baseband chip module saves a related parameter of an application currently running in the volatile memory into the non-volatile memory after receiving the power-off signal; and the peripheral module is deactivated immediately after receiving the power-off signal. Thereby, applications that were running when the mobile terminal was powered off can be recovered after it is rebooted.

What described above are only the implementations of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the protection scope of the present disclosure.

What is claimed is:

1. A mobile terminal capable of recovering an application after being rebooted, wherein the mobile terminal comprises a terminal body and a battery, the terminal body comprises a power-supply management module, a power-off monitoring module, a baseband chip module, a memory module, a peripheral module and a backup-energy storage module, wherein the battery is detachably attached to the terminal body and is configured to power the terminal body via the power-supply management module after being attached to the terminal body; the backup-energy storage module is configured to store electric power when die battery is attached to the terminal body and to power the terminal body via the power-supply management module when the battery is detached from the terminal body, the power-off monitoring module is configured to feed back a power-off signal to the baseband chip module when the battery is detached from the terminal body; the memory module is connected to the baseband chip module and comprises a volatile memory and a non-volatile memory, the non-volatile memory has a status bit store therein, the baseband chip module is configured to, after receiving the power-off signal, save a related parameter of an application currently running in the volatile memory into the non-volatile memory and set the status bit to a first status, and the power-off monitoring module feeds back the power-off signal to the peripheral module when the battery is detached from the terminal body so as to deactivate the peripheral module.

2. The mobile terminal of claim 1, wherein the baseband chip module comprises an interruption detecting unit, and an output terminal of the power-off monitoring module is connected with the interruption detecting unit so as to feed back the power-off signal in the form of an interruption to the baseband chip module when the battery is detached from the terminal body.

3. The mobile terminal of claim 1, wherein the baseband chip module further reads the status bit when the mobile terminal is powered on, and if the status bit is in the first status, then reads the related parameter saved in the nor-volatile memory to recover the application corresponding to the related parameter and to set the status bit to a second status different from the first status.

4. A mobile terminal capable of recovering an application after being rebooted, wherein the mobile terminal comprises a terminal body and a battery, the terminal body comprises a power-supply management module, a power-off monitoring module, a baseband chip module, a memory module, and a backup-energy storage module, wherein the battery is detachably attached to the terminal body and is configured to power the terminal body via the power-supply management module after being attached to the terminal body; the backup-energy storage module is configured to store electric power when the battery is attached to the terminal body and to power the terminal body via the power-supply management module when the battery is detached from the terminal body, the power-off monitoring module is configured to lied back a power-off signal to the baseband chip module when the battery is detached from the terminal body; the memory module is connected to the baseband chip module and comprises a volatile memory and a non-volatile memory, and the baseband chip module is configured to save a related parameter of an application currently running in the volatile memory into the non-volatile memory after receiving the power-off signal.

5. The mobile terminal of claim 4, wherein the battery comprises a cell and a first resistor, the first resistor has a first terminal connected to a cathode of the cell, the cell has the cathode thereof connected to a ground of the terminal body and has an anode thereof connected to a voltage input terminal of the power-supply management module when the battery is attached to the terminal body, the power-off monitoring module comprises a comparator, a second resistor, a third resistor and a fourth resistor, the comparator ha a grounding terminal thereof connected to the ground of the terminal body and an operation voltage terminal thereof connected to a voltage output terminal of the power-supply management module, the second resistor has a first terminal thereof connected to a first input terminal of the comparator and a second terminal thereof connected to the ground of the terminal body, the third resistor has a first terminal thereof connected to the first terminal of the second resistor and a second terminal thereof connected to the voltage output terminal of the power-supply management module, the fourth resistor has a first terminal thereof connected to the voltage input terminal of the power-supply management module and a second terminal thereof connected to a second input terminal of the comparator and, when the battery is attached to the terminal body, to the second terminal of the first resistor, and the resistances of the first resistor, the second resistor, the third resistor and the fourth resistor are determined in such a way that different signals are output by the output terminal of the comparator when the battery is attached to and detached from the terminal body respectively.

6. The mobile terminal of claim 3, wherein the first input terminal of the comparator is a positive input terminal, and the second input terminal of the comparator is an inverting input terminal, and the resistances of the first resistor, the second resistor, the third resistor and the fourth resistor are determined in such a way that, when the battery is attached to the terminal body, a divided voltage at the inverting input terminal of the comparator is lower than a divided voltage at the positive input terminal of the comparator.

7. The mobile terminal of claim 5, wherein the backup-energy storage module comprises a capacitor, which has a first terminal thereof connected to the voltage input terminal of the power-supply management module and a second terminal thereof connected to the ground of the terminal body.

8. The mobile terminal of claim 4, wherein the terminal body further comprises a peripheral module, and the power-off monitoring module further feeds back a power-off signal to the peripheral module when the battery is detached from the terminal body so as to deactivate the peripheral module.

9. The mobile terminal of claim 8, wherein the baseband chip module comprises an interruption detecting unit, and an output terminal of the power-off monitoring module is connected with the interruption detecting unit so as to feed back a power-off signal in the form of an interruption to the baseband chip module when the battery is detached from the terminal body.

10. The mobile terminal of claim 9, wherein the baseband chip module further comprises an input/output (I/O) interface unit, the terminal body further comprises a logic gate, the I/O interface unit is configured to output a deactivating signal of the peripheral module to a first input terminal of the logic gate, the power-off monitoring module outputs the power-off signal to a second input terminal of the logic gate, and an output terminal of the logic gate is connected with the peripheral module so as to deactivate the peripheral module when either of the deactivating signal and the power-off signal appears.

11. The mobile terminal of claim 10, wherein the deactivating signal and the power-off signal are low-voltage signals and the logic gate is an AND gate.

12. The mobile terminal of claim 4, wherein the non-volatile memory further has a status bit stored therein, and the baseband chip module sets the status bit to a first status after receiving the power-off signal.

13. The mobile terminal of claim 12, wherein the baseband chip module further reads the status bit when the mobile terminal is powered on, and if the status bit is in the first status, then reads the related parameter saved its the non-volatile memory to recover the application corresponding to the related parameter and to set the status bit to a second status different from the first status.

14. A method for recovering an application of a mobile terminal after being rebooted, the mobile terminal comprising a terminal body and a battery detachably attached to the terminal body and configured to power the terminal body after being attached to the terminal body, the method comprising:
 monitoring whether the battery is detached from the terminal body;
 if a monitoring result indicates the battery is detached from the terminal body, beginning to supply electric power to the terminal body by a backup-energy storage module of the terminal body;
 saving a related parameter of an application currently running in a volatile memory of the terminal body into a non-volatile memory thereof, and setting a status bit of an "application recovering" instruction saved in the non-volatile memory to a first status; and powering off the mobile terminal.

15. The method of claim 14, wherein the method further comprises:
 powering on the mobile terminal;
 reading the status bit of the "application recovering" instruction saved in the non-volatile memory, and determining whether the status bit thereof is the first status;
 If the status bit thereof is the first status, reading the related parameter saved in the non-volatile memory, recovering the corresponding application according to the related parameter saved in the non-volatile memory, and setting the status bit thereof to be a second status different from the first status.

16. The method of claim 15, wherein after the step of reading the status bit of the "application recovering" instruction saved in the non-volatile memory and determining whether the status bit thereof is the first status, the method further comprises: if the status bit thereof is not the first status, entering into a normal boot interface.

17. The method of claim 14, wherein the method further comprises:
 if the monitoring result indicates the battery is not detachable from the terminal body, returning to execute the step of monitoring whether the battery is detached from the terminal body again.

18. The method of claim 14, wherein the method further comprises:
 turning off a periphery module of the terminal body when supplying the electric power to the terminal body by the backup-energy storage module of the terminal body.

19. The method of claim 14, wherein the method further comprises:
 storing the electric power in the backup-energy storage module when the battery is attached to the terminal body.

* * * * *